United States Patent
Hsu et al.

(10) Patent No.: US 10,816,874 B2
(45) Date of Patent: Oct. 27, 2020

(54) LENS DRIVING MECHANISM AND ELECTRONIC DEVICE HAVING THE SAME

(71) Applicant: TDK TAIWAN CORP., Taoyuan (TW)

(72) Inventors: Shang-Yu Hsu, Taoyuan (TW); Shou-Jen Liu, Taoyuan (TW); Chia-Pin Hsu, Taoyuan (TW)

(73) Assignee: TDK TAIWAN CORP., Yangmei, Taoyuan (TW)

( * ) Notice: Subject to any disclaimer, the term of this patent is extended or adjusted under 35 U.S.C. 154(b) by 0 days.

(21) Appl. No.: 16/534,265

(22) Filed: Aug. 7, 2019

(65) Prior Publication Data

US 2019/0384139 A1 Dec. 19, 2019

Related U.S. Application Data

(63) Continuation of application No. 15/590,395, filed on May 9, 2017, now Pat. No. 10,416,533.

(Continued)

(30) Foreign Application Priority Data

Feb. 22, 2017 (CN) .......................... 2017 1 0096738

(51) Int. Cl.
*G03B 7/10* (2006.01)
*G03B 3/10* (2006.01)
*G03B 17/12* (2006.01)
*G03B 7/08* (2014.01)
*G03B 13/36* (2006.01)

(Continued)

(52) U.S. Cl.
CPC ................. *G03B 7/10* (2013.01); *G03B 3/10* (2013.01); *G03B 7/08* (2013.01); *G03B 17/12* (2013.01); *G03B 13/36* (2013.01); *G03B 29/00* (2013.01); *G03B 2205/0053* (2013.01); *H04N 5/2254* (2013.01); *H04N 5/23296* (2013.01)

(58) Field of Classification Search
CPC . G03B 7/10; G03B 7/08; G03B 13/36; G03B 29/00; H04N 5/23296; H04N 5/2254; H04N 5/2253; H04N 5/2257
See application file for complete search history.

(56) References Cited

U.S. PATENT DOCUMENTS 7,991,279 B2   8/2011  Chiang
2007/0280667 A1*  12/2007  Shin ........................ G02B 7/04
396/133

(Continued)

FOREIGN PATENT DOCUMENTS

CN          204790139 U    11/2015

*Primary Examiner* — Lin Ye
*Assistant Examiner* — Tuan H Le
(74) *Attorney, Agent, or Firm* — Muncy, Geissler, Olds & Lowe, P.C.

(57) ABSTRACT

A lens driving mechanism is provided for moving a lens unit along a light axis, including a frame, a base, a lens holder, and a driving assembly. The frame has plastic material and forms an opening. The base is in contact with and fixed to the frame, wherein a space is formed between the base and the frame. The lens holder is movably disposed in the space for holding the lens unit, wherein an external light enters the space through the opening to the lens unit. The driving assembly is disposed in the space and is connected to the lens holder and the frame, to impel the lens unit to move along the light axis.

20 Claims, 8 Drawing Sheets

Related U.S. Application Data

(60) Provisional application No. 62/363,450, filed on Jul. 18, 2016.

(51) Int. Cl.
*G03B 29/00* (2006.01)
*H04N 5/225* (2006.01)
*H04N 5/232* (2006.01)

(56) References Cited

U.S. PATENT DOCUMENTS

| | | | |
|---|---|---|---|
| 2009/0251808 A1 | 10/2009 | Higuchi et al. | |
| 2009/0303380 A1* | 12/2009 | Seo | H04N 5/2253 |
| | | | 348/373 |
| 2010/0157137 A1 | 6/2010 | Imai et al. | |
| 2011/0102920 A1* | 5/2011 | Shyu | G02B 7/08 |
| | | | 359/823 |
| 2012/0002102 A1 | 1/2012 | Sekimoto | |
| 2012/0294602 A1 | 11/2012 | Sekine | |
| 2014/0192260 A1* | 7/2014 | Oh | H04N 5/2251 |
| | | | 348/374 |
| 2016/0006920 A1 | 1/2016 | Gomes Da Motta et al. | |
| 2016/0088198 A1* | 3/2016 | An | H04N 5/2252 |
| | | | 348/374 |
| 2016/0178924 A1* | 6/2016 | Lim | G02B 7/08 |
| | | | 359/557 |

\* cited by examiner

LENS DRIVING MECHANISM AND ELECTRONIC DEVICE HAVING THE SAME

CROSS REFERENCE TO RELATED APPLICATIONS

This Application is a continuation application of U.S. patent application Ser. No. 15/590,395, filed May 9, 2017, which claims priority claims priority of provisional U.S. patent application Ser. No. 62/363,450 filed on Jul. 18, 2016 and China Patent Application No. 201710096738.6 filed on Feb. 22, 2017, the entirety of which is incorporated by reference herein.

BACKGROUND OF THE DISCLOSURE

Field of the Invention

The present invention relates to a lens driving mechanism, and more particularly to a lens driving mechanism having a frame comprising plastic material.

Description of the Related Art

Conventional cell phones or tablet computers usually have a camera lens module which includes a lens unit and a lens driving mechanism such as voice coil motor (VCM). A driving assembly including magnets and coils is usually provided for moving the lens unit in the lens driving mechanism along a light axis thereof, so as to facilitate auto-focusing of the camera.

FIG. 1A shows a conventional voice coil motor 10 connected to a transparent plate G and a circuit board P, and FIG. 1B is a cross-sectional view along line A-A in FIG. 1A. Referring to FIGS. 1A and 1B, a frame 11 of the voice coil motor 10 is assembled to a base 13, and a lens holder 12 is disposed in a space 101 formed by the frame 11 and the base 13. An upper spring sheet S1 connects the frame 11 to the lens holder 12, and a lower spring sheet S2 connects the base 13 to the lens holder 12, so that the lens holder 12 and a lens unit (not shown) received therein can be moved relative to the frame 11 and the base 13 along a light axis thereof by the voice coil motor 10. Specifically, the transparent plate G is adhered to a top surface 111 of the frame 11, so as to protect the lens unit and other components received in the voice coil motor 10 and allow light to enter the voice coil motor 10 through the transparent plate G.

However, as the frame 11 of the voice coil motor 10 is usually formed by stamping a metal plate which may comprise magnetically conductive material, and miniaturization of the portable electronic devices has become an increasing trend, the communication element (such as antenna or wireless communication chip) in the electronic device can be adversely influenced by the metal frame 11 and result in poor performance by the electronic device. Additionally, since the upper spring sheet S1 is a flat and thin component, four depressed structures 112 (FIGS. 1A and 1B) are usually formed on the metal frame 11, so that the upper spring sheet S1 can be connected much easier to the upper surface of the lens holder 12 and the depressed structure 112 (FIG. 1B). In this configuration, the adhesion area between the top surface 111 and the transparent plate G can be reduced, and the structural strength of the mechanism can also be reduced after assembly.

BRIEF SUMMARY OF THE DISCLOSURE

Accordingly, one objective of the present invention is to provide a lens driving mechanism for moving a lens unit along a light axis. The lens driving mechanism includes a frame, a base, a lens holder, and a driving assembly. The frame comprises plastic and has an opening. The base is in contact with and fixed to the frame, wherein a space is formed between the base and the frame. The lens holder is movably disposed in the space for holding the lens unit, wherein an external light enters the space through the opening to the lens unit. The driving assembly is disposed in the space and is connected to the lens holder and the frame, to impel the lens unit along the light axis.

According to some embodiments of the disclosure, the frame further has a protrusion, a top surface, and a side surface extended from an edge of the top surface and toward the base, wherein the protrusion protrudes from an inner surface of the frame and corresponding to an adjoining area between the top and side surfaces, to enhance the structural strength of the frame.

According to some embodiments of the disclosure, the top surface has a quadrangular shape.

According to some embodiments of the disclosure, the frame comprises metal.

According to some embodiments of the disclosure, the lens driving mechanism further comprises a conductive wire directly formed on/in the frame by Molded Interconnect Device (MID) technology.

According to some embodiments of the disclosure, the driving assembly includes a first magnetic element and a second magnetic element respectively disposed on the frame and the lens holder, and the lens holder is moved relative to the frame and the base by magnetic force generated between the first and second magnetic elements.

According to some embodiments of the disclosure, the frame further has a holding portion protruding from an inner surface of the frame and restricting the first magnetic element in a predetermined position on the inner surface.

According to some embodiments of the disclosure, the holding portion forms a U-shaped structure with the first magnetic element disposed therein.

According to some embodiments of the disclosure, the first magnetic element comprises a multipolar magnet.

According to some embodiments of the disclosure, the first magnetic element comprises a magnet, and the second magnetic element comprises a coil with an electrical current applied thereto.

According to some embodiments of the disclosure, the lens holder has a protruding slider, and the frame further has a restricting structure with the slider received therein to restrict movement of the slider.

According to some embodiments of the disclosure, the restricting structure has two restricting portions protruding from an inner surface of the frame, and a recess is formed between the two restricting portions and extended along the light axis, wherein the width of the recess exceeds that of the slider.

According to some embodiments of the disclosure, the lens driving mechanism has a substantially polygonal structure and further comprises two driving assemblies disposed on opposite sides thereof to move the lens unit along the light axis, wherein the slider and the restricting structure are situated on a side of the lens driving mechanism different from the driving assemblies.

According to some embodiments of the disclosure, the frame forms a quadrangular shape and further has a plastic main body and a metal plate, the opening is formed on the main body, and the metal plate is disposed on a side of the main body.

According to some embodiments of the disclosure, the metal plate forms a plurality of holes, and the main body forms a plurality of protruding portions engaged in the holds.

Another objective of the present invention is to provide an electronic device. The electronic device comprises the aforementioned lens driving mechanism, a housing, and a wireless communicating element. The lens driving mechanism has a substantially polygonal structure, and the lens driving mechanism and the wireless communicating element are disposed in the housing. The driving assembly is adjacent to a first side of the lens driving mechanism, and the wireless communicating element is adjacent to a second side of the lens driving mechanism, different from the first side.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it should be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1A:
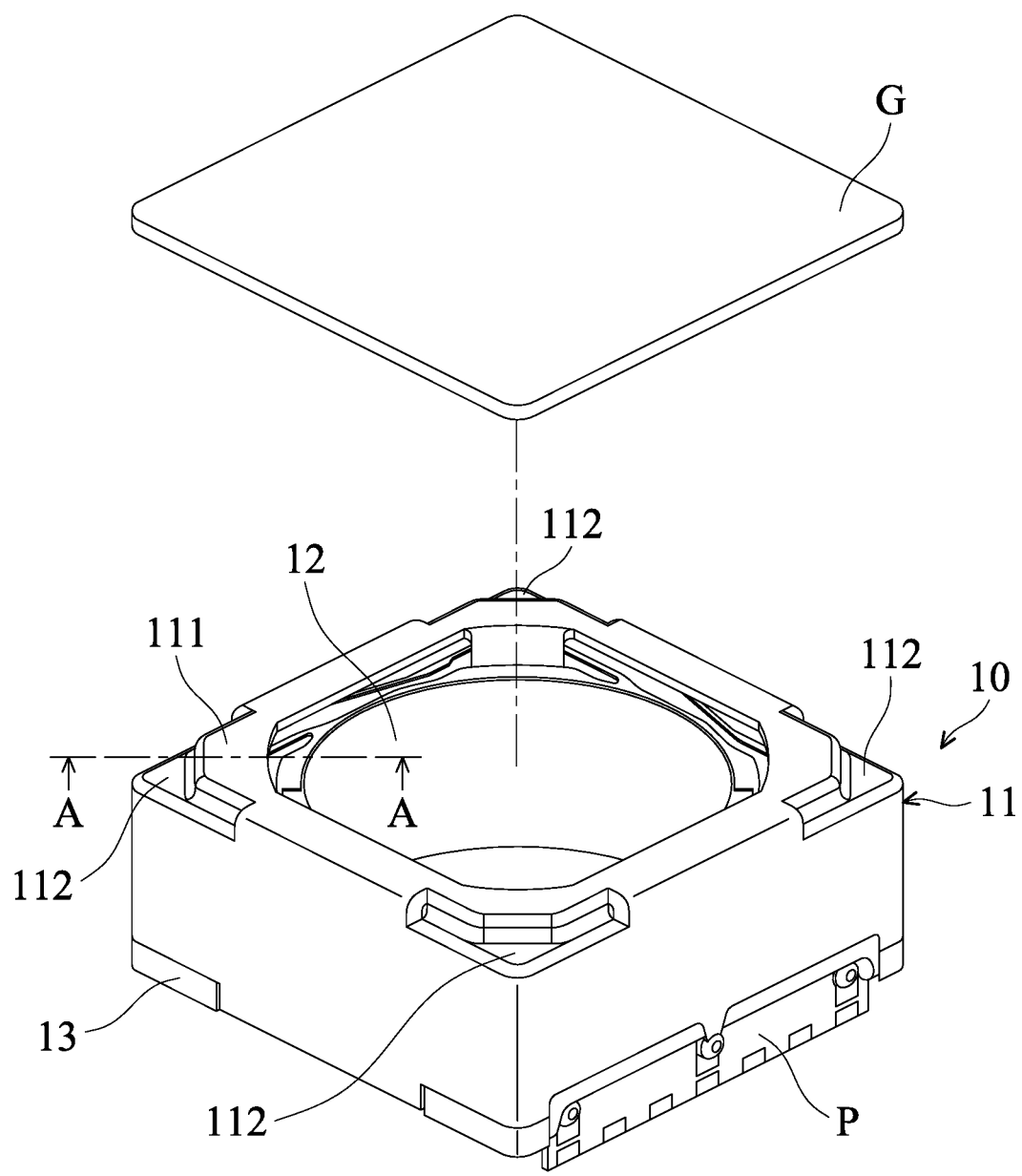
FIG. 1A shows a conventional voice coil motor connected to a transparent plate G and a circuit board P.
Figure 1B:
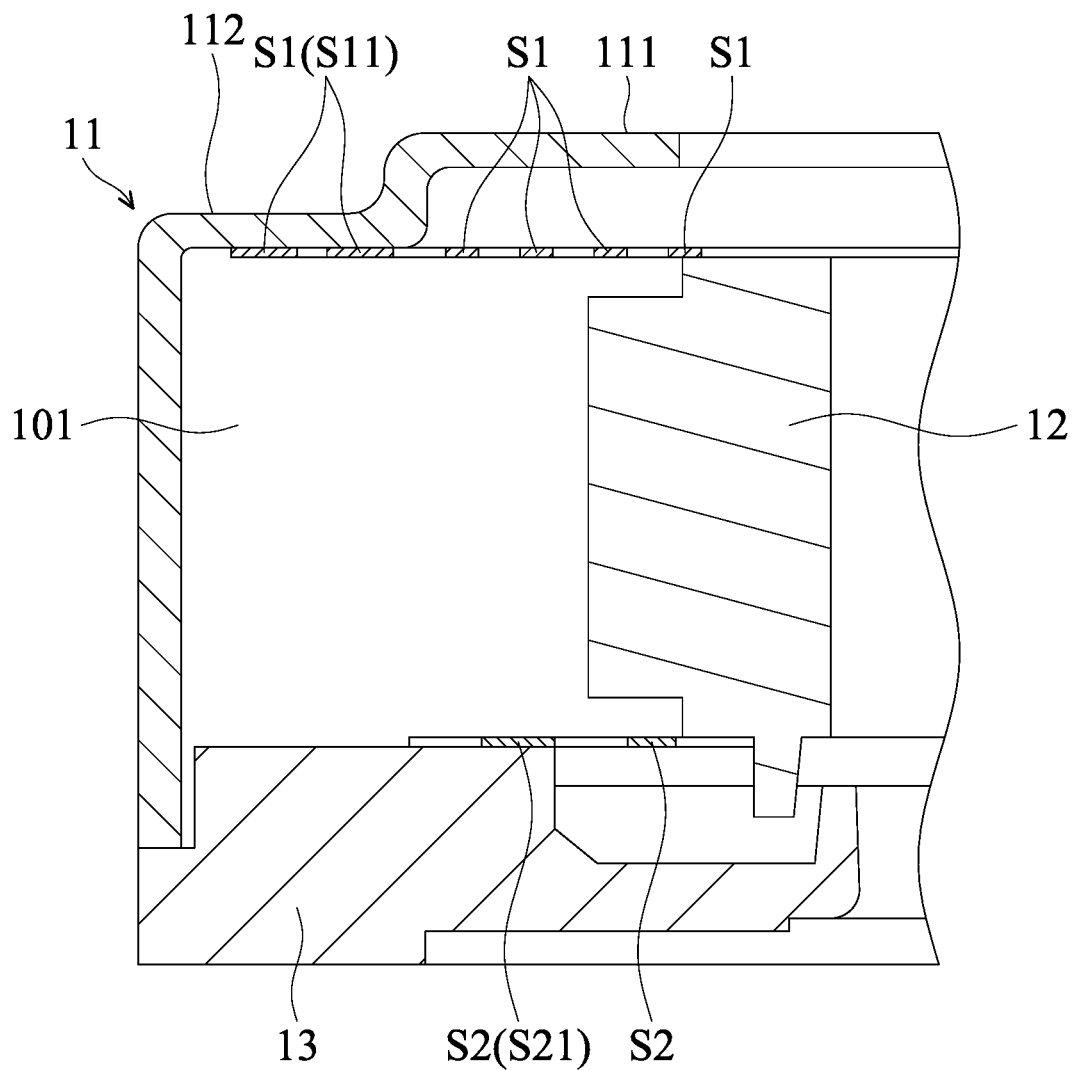
FIG. 1B is a cross-sectional view along line A-A in FIG. 1A.
Figure 2:
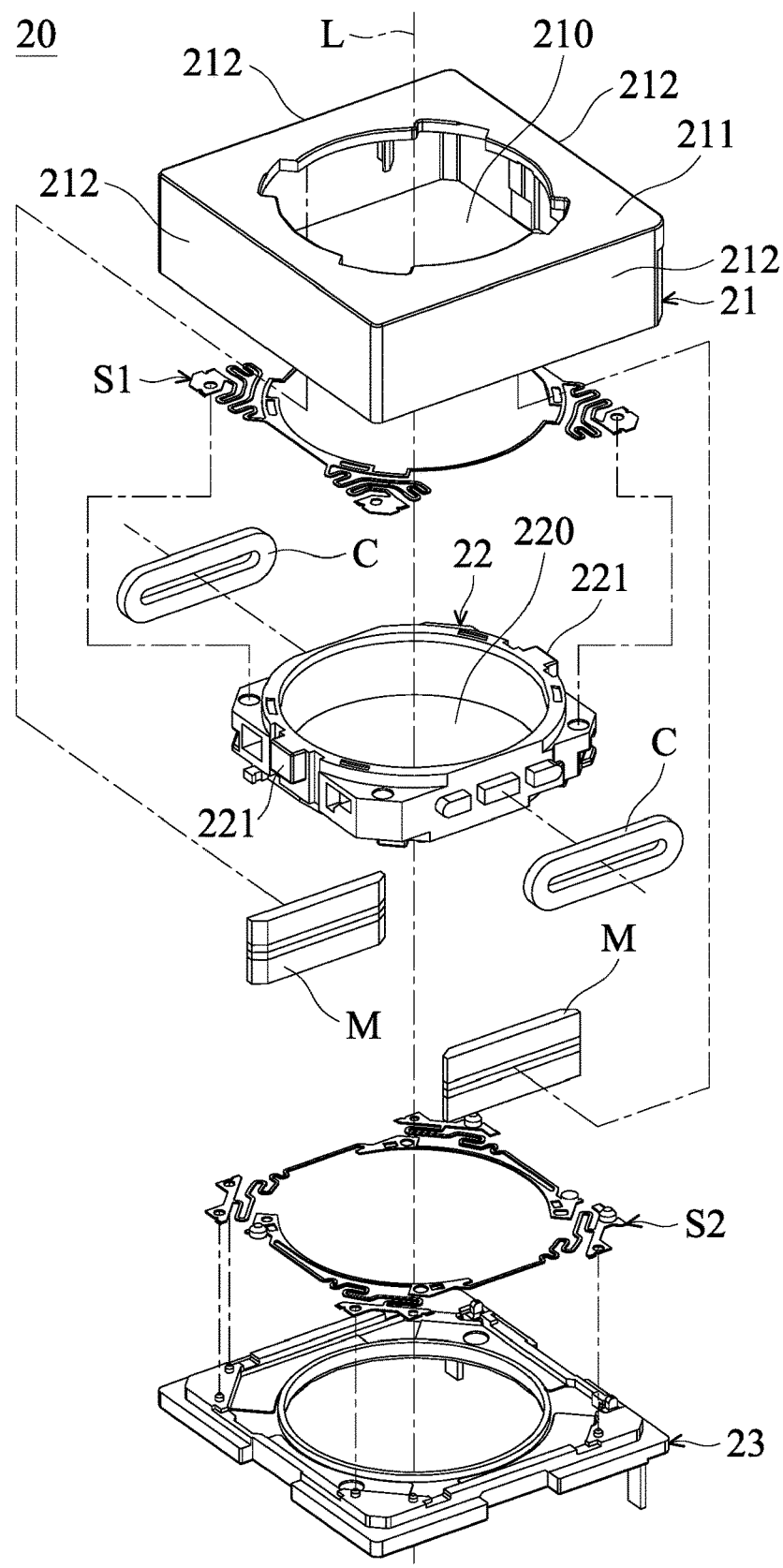
FIG. 2 is an exploded diagram of a lens driving mechanism 20 according to an embodiment of the invention.

FIG. 2 is an exploded diagram of a lens driving mechanism 20 according to an embodiment of the invention. As shown in FIG. 2, the lens driving mechanism 20 is provided for holding a lens unit (not shown), wherein a driving assembly having magnets and coils is disposed in the driving mechanism 20 to force the lens unit to move along the light axis L of the lens unit (optical element), so as to achieve auto focusing of a camera.

The lens driving mechanism 20 primarily comprises a frame 21, a lens holder 22, a base 23, an upper spring sheet S1, a lower spring sheet S2, at least a first magnetic element M, and at least a second magnetic element C. The frame 21 has a substantially quadrangular structure and forms an opening 210. Four side surfaces 212 are extended from a top surface 211 of the frame 21 toward the base 23. The base 23 is fixed to and in contact with the frame 21, and the lens holder 22 (movable part) is movably disposed between the base 23 and the frame 21 (fixed part). The lens holder 22 has a through hole 220 for receiving and holding the lens unit (not shown). It should be noted that external light can enter the lens driving mechanism 20 via the opening 210 of the frame 21, sequentially propagate through the lens unit at the center of the lens holder 22 and the base 23, and finally reach an image sensor (such as CCD) to generate an image.

As depicted in FIG. 2, the first magnetic elements M are disposed on the inner surfaces of the frame 21, and the second magnetic elements C are disposed on the outer surfaces of the lens holder 22, corresponding to the first magnetic elements M. In this embodiment, the first magnetic elements M may comprise bi-polar or multipolar magnets, and the second magnetic elements C may comprise coils. To move the lens unit along the light axis L, an electrical current can be applied to the second magnetic elements C, and the magnetic fields generated by the second magnetic elements C can interact with those of the first magnetic elements M to generate a magnetic force. Thus, the lens unit can be controlled and moved along the light axis L by the magnetic force to achieve rapid focusing and OIS (Optical Image Stabilization). In some embodiments, the first magnetic elements M can be coils, and the second magnetic elements C can be bi-polar or multipolar magnets corresponding to the coils, so that the lens unit can also be controlled and moved along the light axis L by magnetic force.

Figure 3A:
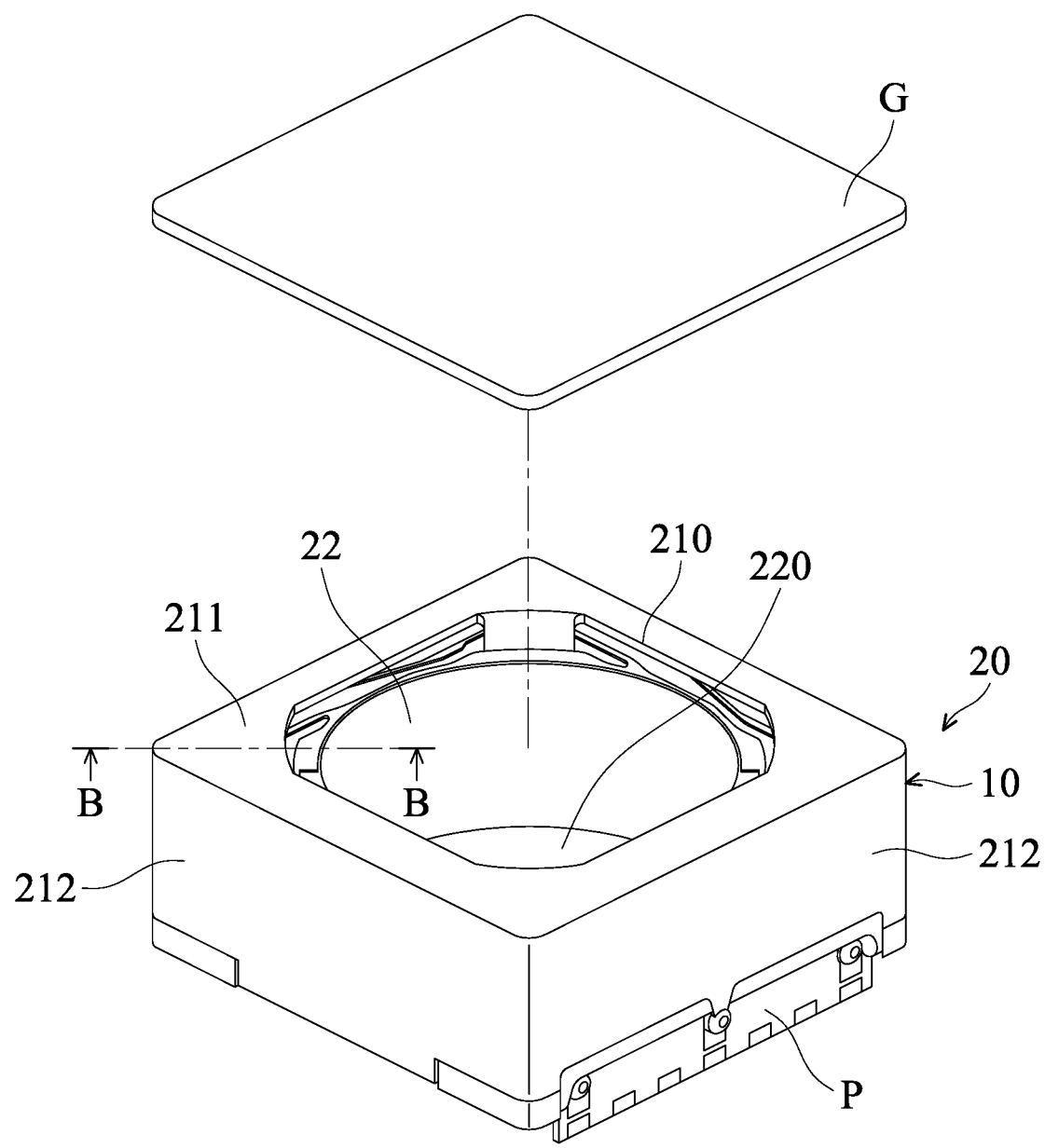
FIG. 3A is a perspective diagram of the lens driving mechanism in FIG. 2 with a transparent plate and a circuit board connected thereto.
Figure 3B:
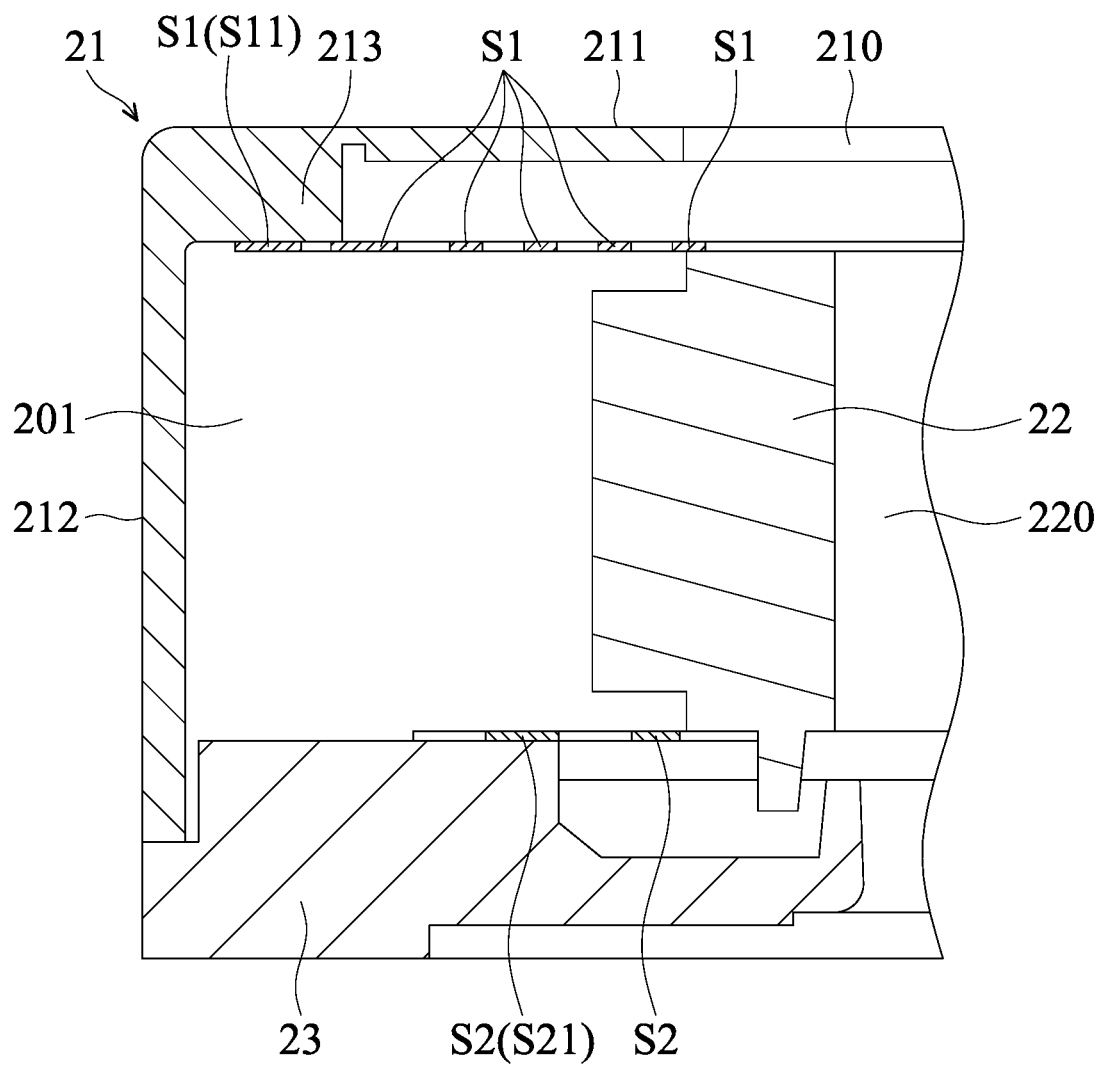
FIG. 3B is a cross-sectional view along line B-B in FIG. 3A.

Referring to FIGS. 2, 3A, and 3B, FIG. 3A is a perspective diagram of the lens driving mechanism 20 in FIG. 2 with a transparent plate G and a circuit board P assembled thereto, and FIG. 3B is a cross-sectional view along line B-B in FIG. 3A. As shown in FIG. 3A, a transparent plate G (such as plastic or glass plate) is assembled to the lens driving mechanism 20. Here, the transparent plate G is adhered to a flat top surface 211 of the frame 21, so as to protect the lens unit and other components in the lens driving mechanism 20, and allow light to enter the lens driving mechanism 20 through the transparent plate G. Therefore, an image sensor (such as CCD) can receive and transfer light into electronic signals. The lens driving mechanism 20 may be electrically connected to an external power source via the circuit board P. Moreover, the lens driving mechanism 20 may transmit electronic signals to a processor outside of the driving mechanism 20 via the circuit board P for data processing.

In FIGS. 2 and 3B, the lens holder 22 and the upper and lower spring sheets S1 and S2 are all disposed in the space 201 which is formed between the frame 21 and the base 23. The upper spring sheet S1 (first resilient member) is located on the top side of the lens holder 22 and connects the frame 21 to the lens holder 22, and the lower spring sheet S2 (second resilient member) is located on the bottom side of the lens holder 22 and connects the base 23 to the lens holder 22. Here, the first and second resilient members S1 and S2 respectively have a first portion S11 and a second portion S21 affixed to the frame 21 and the base 23, wherein the first and second portions S11 and S21 do not overlap when viewed along the light axis L (vertical direction). In this embodiment, as the frame 21 comprises plastic (pure plastic or metal-doped plastic material), it can be integrally formed in one piece by injection molding or insert molding. Specifically, at least a protrusion 213 is directly formed on an inner surface of the frame 21 (FIG. 3B), corresponding to an adjoining area (corner) between the top surface 211 and the side surfaces 212. Hence, the top surface 211 of the frame 21 can have a large and flat adhesion area to enhance the connection between the frame 21 and the transparent plate G. Additionally, as the protrusion 213 is located corresponding to the adjoining area between the top surface 211 and the side surfaces 212, the structural strength of the frame 21 can also be improved.

In some embodiments, as the frame 21 may comprise plastic material which is doped with metal particles, the intensity of the magnetic field within the lens driving mechanism 20 can be increased when compared with pure plastic material, and the structural strength thereof can also be improved when compared with metal plate which is formed by conventional stamping process. Moreover, as the frame 21 comprises plastic material and therefore can be integrally formed in one piece, electrical circuits can be directly formed on or in the frame 21 by Molded Interconnect Device (MID) or Laser Direct Structuring (LDS) technologies. Thus, additional electronic element (such as the circuit board P in FIG. 3A) for electrical connection to the external circuits can be omitted, so as to reduce production cost and the dimensions of the lens driving mechanism 20.

Figure 4A:
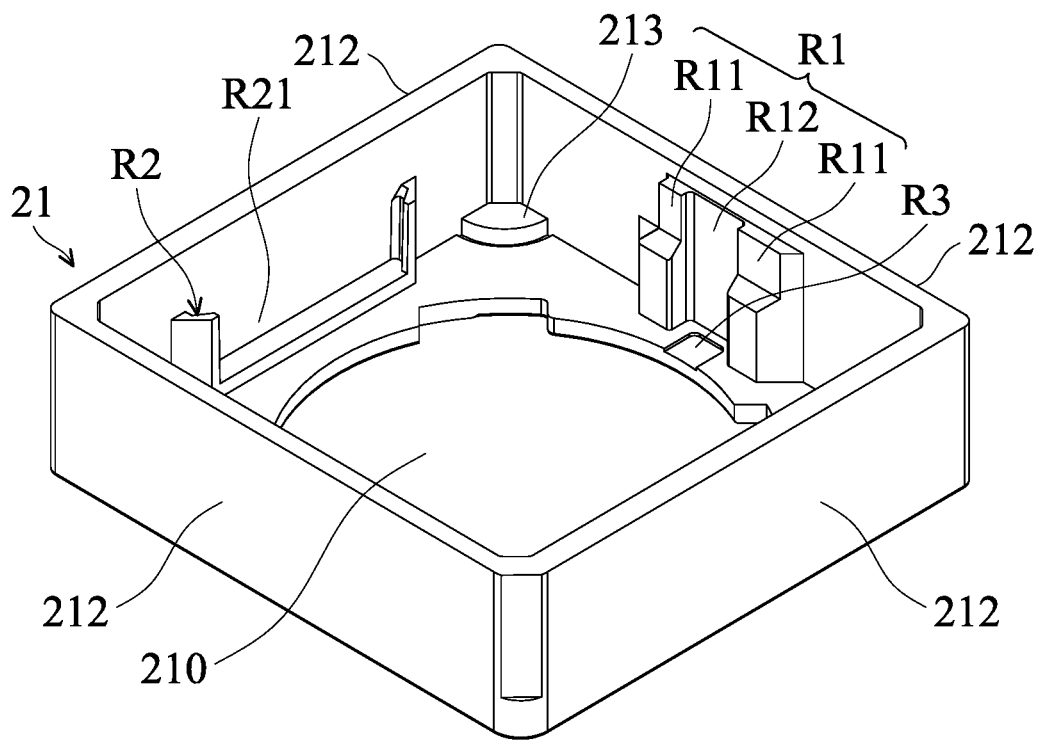
FIG. 4A is a perspective diagram of the frame in FIG. 3A.
Figure 4B:
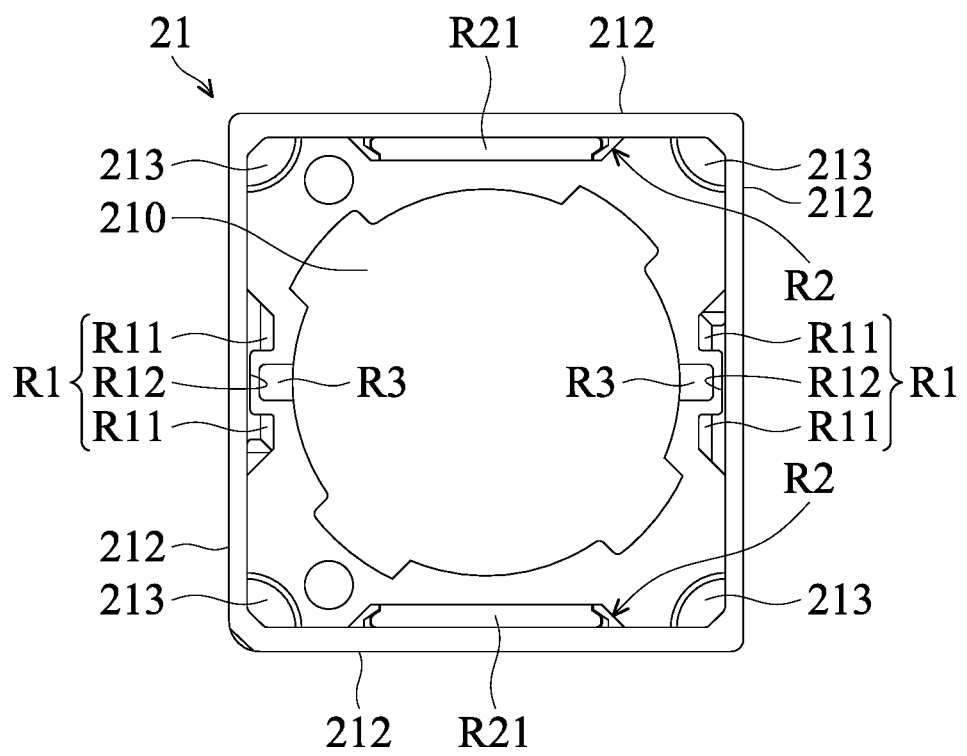
FIG. 4B is a top view of the frame in FIG. 4A.
Figure 5A:
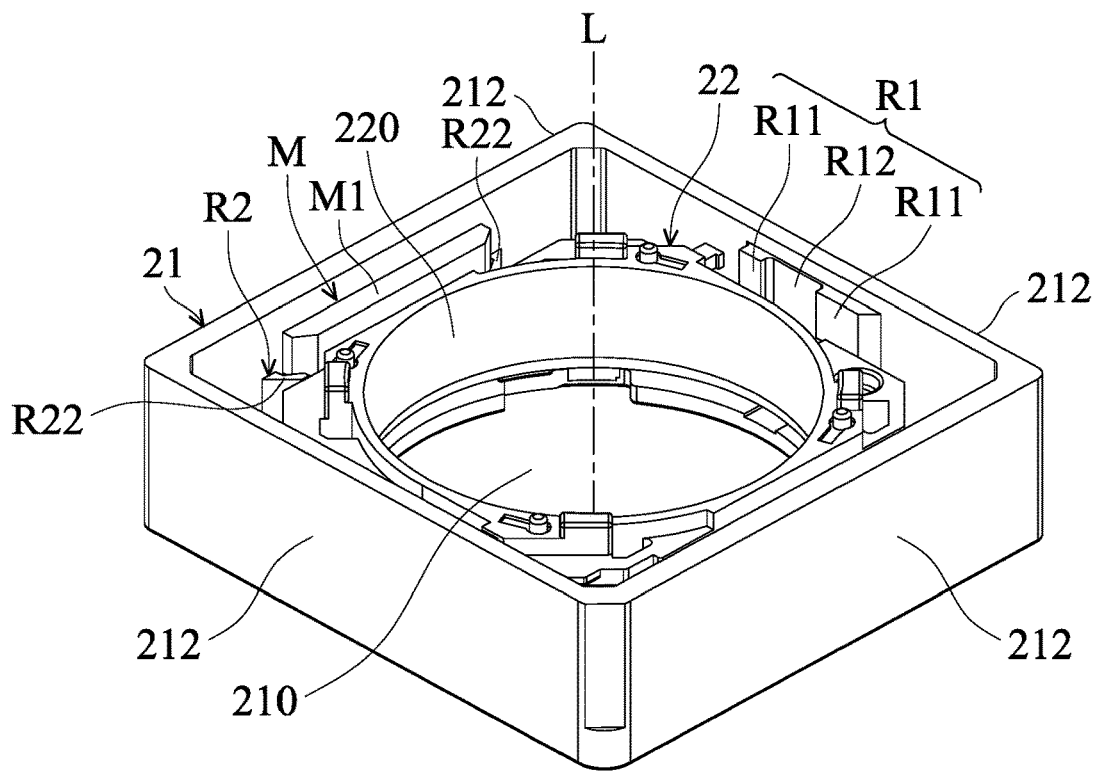
FIG. 5A is perspective diagram of the frame, the lens holder, and the first magnetic element when assembled to each other.
Figure 5B:
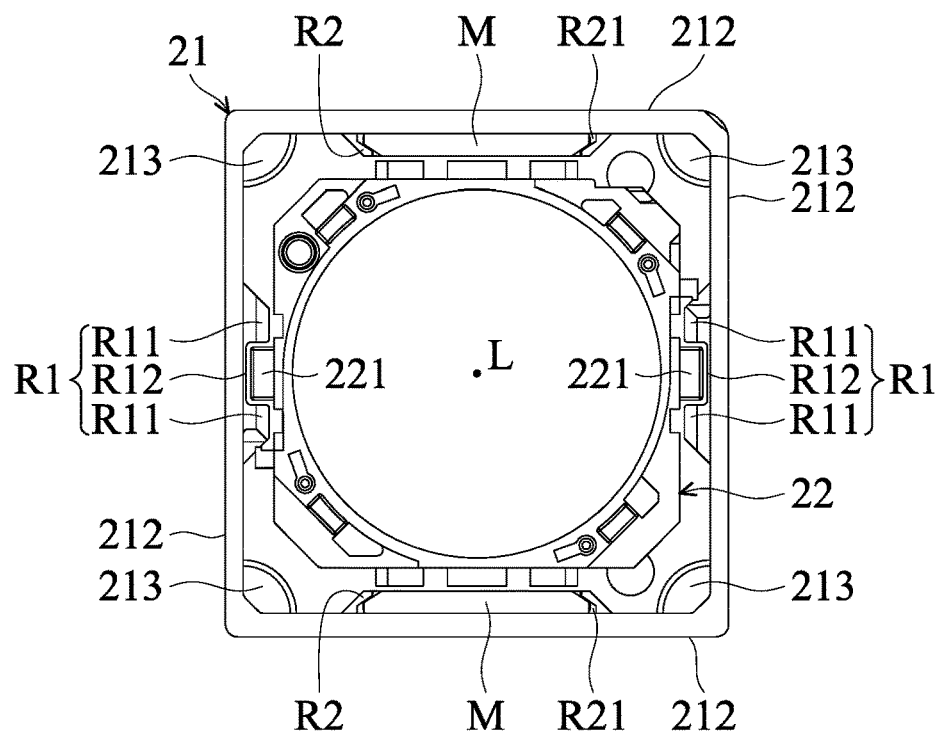
FIG. 5B is a top view of the frame, the lens holder, and the first magnetic element in FIG. 5A.

FIG. 4A is a perspective diagram of the frame 21 in FIG. 3A, and FIG. 4B is a top view of the frame 21 in FIG. 4A. FIG. 5A is a perspective diagram of the frame 21, the lens holder 22, and the first magnetic element M when assembled to each other, and FIG. 5B is a top view of the frame 21, the lens holder 22, and the first magnetic element M in FIG. 5A. As shown in FIGS. 2 and 4A-5B, at least one protruding slider 221 is formed on the outer surface of the lens holder 22, and at least one restricting structure R1 is formed on the inner surface of the frame 21, corresponding to the slider 221. Each restricting structure R1 has two restricting portions R11 protruding from the inner surface of the frame 21, wherein a longitudinal recess R12 extended along the light axis L is formed between the two restricting portions R11, and the width of the recess R12 exceeds that of the slider 221. In this embodiment, as the slider 221 is received in the restricting structure R1, it can be restricted from moving along horizontal directions, so as to prevent from collision with other components in the lens driving mechanism 20. Hence, the slider 221 on the lens holder 22 forms a first structure that has a convex shape, and the restricting structure R1 on the frame 21 forms a second structure that has a concave shape for receiving the slider 221, wherein the slider 221 and the restricting structure R1 constitute a relative movement restricting means to restrict the movement of the movable part relative to the fixed part.

Still referring to FIGS. 2, and 4A-5B, at least a holding portion R2 protrudes from an inner surface of the frame 21 and forms a U-shaped structure. The first magnetic element M is received and held in a recess R21 at the center of the holding portion R2, so as to prevent the first magnetic element M being separated from the frame 21, and secure the first magnetic element M in a predetermined position on the inner surface of the frame 21. In FIG. 5A, the first magnetic element M and the holding portion R2 respectively have a first end surface M1 and a second end surface R22 facing the light emitting end of the driving mechanism, opposite to the opening 210 of the frame 21 at the light incident end of the driving mechanism. Specifically, the first and second end surfaces M1 and R22 are located at different heights along the light axis L, and the first end surface M1 of the first magnetic element M is closer to the light emitting end than the second end surface R22 of the holding portion R2. As the frame 21 in this embodiment comprises plastic material and therefore can be integrally formed in one piece, the restricting structure R1 and the holding portion R2 can be directly formed on the inner surface of the frame 21 for respectively retaining the lens holder 22 and the first magnetic element M, instead of using additional positioning components, thereby efficiently reducing the cost of materials and assembly. In FIG. 5B, when viewed in a horizontal direction perpendicular to the light axis L, the slider 221 (first structure) at least partially overlap the restricting structure R1 (second structure). Additionally, when viewed in a direction parallel to the light axis L, the first magnetic elements M do not overlap the lens holder 22 (movable part).

Furthermore, as shown in FIGS. 2, and 4A-5B, the lens driving mechanism 20 forms a substantially quadrangular structure and includes two set of driving assemblies (each driving assembly has a first magnetic element M and a second magnetic element C). Those driving assemblies are disposed on opposite sides of the lens holder 22 for moving the lens holder 22 and the lens unit along the light axis L. Specifically, the slider 221 and the restricting structure R1 are located on a side of the lens driving mechanism 20 different from the driving assemblies. In this embodiment, the sliders 221 and the restricting structures R1 are disposed on the left and right sides of the lens holder 22 (FIG. 5B), different from the driving assemblies (first magnetic element M) disposed on the upper and lower sides of the lens holder 22.

Figure 6:
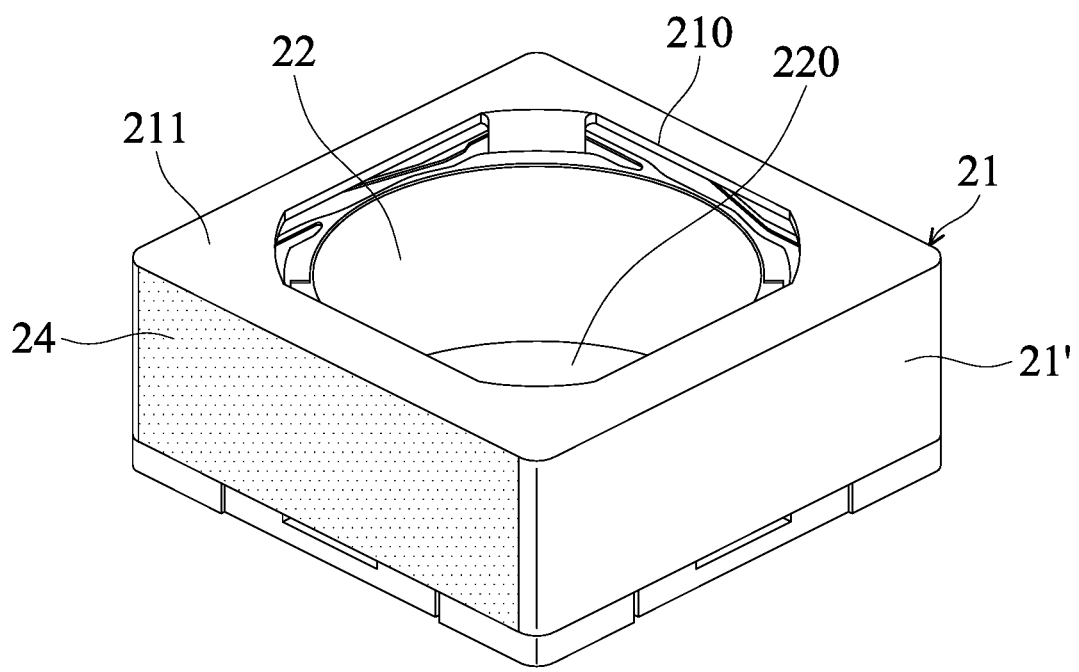
FIG. 6 perspective diagram of a lens driving mechanism according to another embodiment of the invention.

FIG. 6 illustrates a lens driving mechanism 20 according to another embodiment of the invention. As shown in FIG. 6, the frame 21 of the lens driving mechanism 20 has a hollow quadrangular main body 21' and a metal plate 24. The main body 21' comprises plastic material, and the metal plate 24 can be integrally formed on a side of the main body 21' by insert molding.

Figure 7:
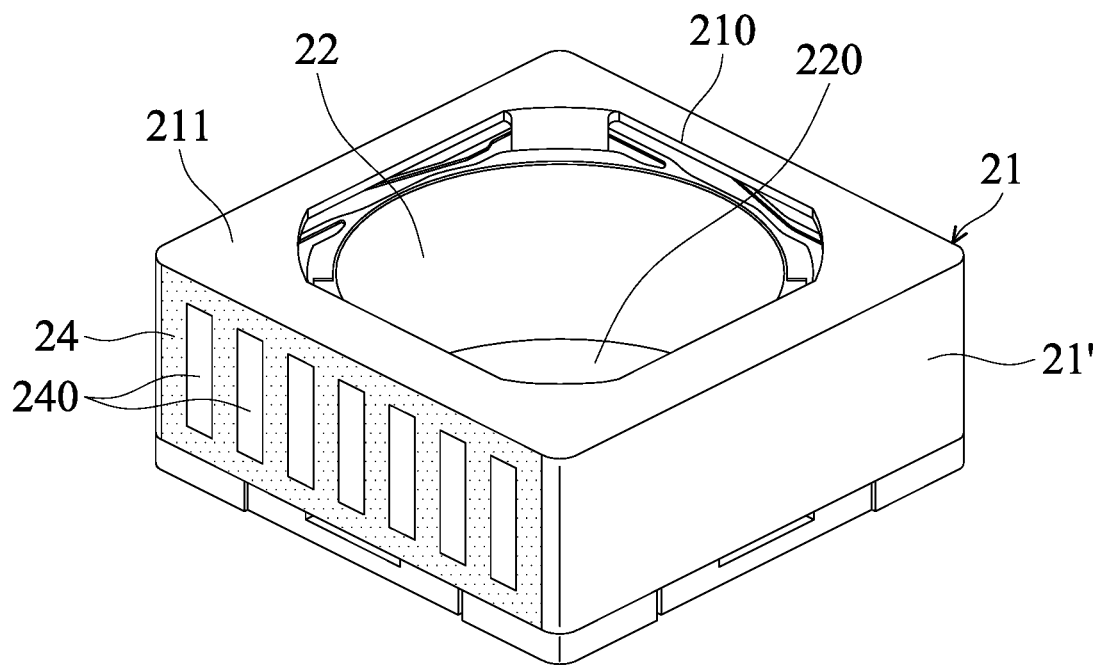
FIG. 7 perspective diagram of a lens driving mechanism according to another embodiment of the invention.

FIG. 7 illustrates a lens driving mechanism 20 according to another embodiment of the invention. The embodiment of FIG. 7 is different from the embodiment of FIG. 6 in that the metal plate 21 further forms a plurality of holds 240, and the main body 21' further forms a plurality of protruding portions respectively engaged in the holds 240.

According to the embodiments as described above, the invention further provides an electronic device that includes the lens driving mechanism 20 of any one of the foregoing embodiments, wherein the lens driving mechanism 20 may have a substantially polygonal structure. Specifically, the lens driving mechanism 20 and at least a wireless communicating element (such as antenna or wireless communication chip) are disposed in the housing of the electronic device, wherein the driving assembly is located adjacent to a first side of the lens driving mechanism 20 (such as the upper or lower side of the lens holder 22 in FIG. 5B), and the wireless communicating element is located adjacent to a second side of the lens driving mechanism 20 (such as the left or right side of the frame 21 in FIG. 5B).

In summary, the invention provides a lens driving mechanism and an electronic device having the same. As the frame of the lens driving mechanism comprises plastic material, it can be integrally formed in one piece, so as to greatly reduce the dimensions of the lens driving mechanism and production cost thereof. Moreover, even though the communication element (such as antenna or wireless communication chip) in the electronic device is close to the lens driving mechanism, the plastic material of the lens driving mechanism can reduce influence to the communication element, so as to facilitate miniaturization of the electronic device and ensure high performance of the communication element.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driving mechanism for moving an optical element, comprising:
   a fixed part, having a frame and a base affixed to the frame, wherein the frame has a top surface and four side surfaces extending from the top surface toward the base;
   a movable part for holding the optical element that defines an light axis, wherein the movable part is movable relative to the fixed part, and the frame is shaped in a rectangle when viewed along the light axis;
   a driving assembly for driving the movable part to move relative to the fixed part, wherein the driving assembly has a first magnetic element; and
   a relative movement restricting means formed on the movable part and the fixed part, to restrict movement of the movable part relative to the fixed part,
   wherein the relative movement restricting means has a first structure formed on the movable part and a second structure integrally formed on an inner surface of the frame, and the first structure is concealed by the second structure in a radial direction of the optical element that is perpendicular to the light axis.

2. The driving mechanism as claimed in claim 1, wherein the fixed part comprises plastic material.

3. The driving mechanism as claimed in claim 1, wherein the relative movement restricting means restricts movement of the movable part relative to the fixed part in a direction perpendicular to the light axis.

4. The driving mechanism as claimed in claim 1, wherein the relative movement restricting means restricts rotation of the movable part relative to the fixed part around the light axis.

5. The driving mechanism as claimed in claim 1, wherein the second structure is shaped corresponding to the first structure.

6. The driving mechanism as claimed in claim 5, wherein the first structure has a convex shape, and the second structure has a concave shape corresponding to the convex shape of the first structure.

7. The driving mechanism as claimed in claim 6, wherein the first structure is movably received in the second structure.

8. The driving mechanism as claimed in claim 6, wherein when viewed in a direction perpendicular to the light axis, the first structure at least partially overlap the second structure.

9. The driving mechanism as claimed in claim 1, wherein when viewed in a direction parallel to the light axis, the first magnetic element does not overlap the movable part.

10. The driving mechanism as claimed in claim 1, wherein the fixed part has a holding portion protruding from the inner surface of the fixed part for holding the first magnetic element, and the first magnetic element and the holding portion respectively have a first end surface and a second end surface facing a light emitting end of the driving mechanism, wherein the first and second end surfaces are located at different heights along the light axis.

11. The driving mechanism as claimed in claim 10, wherein the first end surface of the first magnetic element is closer to the light emitting end than the second end surface of the holding portion.

12. The driving mechanism as claimed in claim 1, further comprising a first resilient member and a second resilient member respectively connected to opposite sides of the movable part, wherein the first and second resilient members respectively have a first portion and a second portion affixed to the fixed part, and the first and second portions do not overlap when viewed along the light axis.

13. The driving mechanism as claimed in claim 1, wherein the first structure comprises a slider protruding from the movable part and slidable received in the second structure to restrict movement of the movable part relative to the fixed part.

14. The driving mechanism as claimed in claim 13, wherein the second structure has two restricting portions protruding from the inner surface of the fixed part, and a recess is formed between the two restricting portions and extended along the light axis, wherein the width of the recess exceeds that of the slider.

15. The driving mechanism as claimed in claim 1, wherein the driving assembly further has a second magnetic element, and the first and second magnetic elements are respectively disposed on the fixed part and the movable part.

16. The driving mechanism as claimed in claim 15, wherein the first magnetic element comprises a magnet, and the second magnetic element comprises a coil.

17. The driving mechanism as claimed in claim 15, wherein the fixed part comprises plastic material.

18. The driving mechanism as claimed in claim 15, wherein the movable part is received in a space formed between the base and the frame.

19. The driving mechanism as claimed in claim 18, wherein the frame has an opening, and an external light enters the space through the opening to the optical element.

20. The driving mechanism as claimed in claim 1, further comprising a conductive wire directly formed on/in the fixed part by Molded Interconnect Device (MID) technology.

* * * * *